United States Patent [19]

Hocker et al.

[11] 4,150,213
[45] Apr. 17, 1979

[54] PROCESS FOR THE PRODUCTION OF POLYISOCYANATE POLYADDITION PRODUCTS WHICH COMPRISES REACTING ORGANIC POLYISOCYANATES, POLYCYCLIC CONDENSATION PRODUCTS OF FORMALDEHYDE WITH DIAMINES, AND WATER

[75] Inventors: Jürgen Hocker, Berg.-Gladbach; Wolfgang Wellner, Cologne; Walter Uerdingen, Berg.-Gladbach, all of Fed. Rep. of Germany

[73] Assignee: Bayer Aktiengesellschaft, Leverkusen, Fed. Rep. of Germany

[21] Appl. No.: 894,230

[22] Filed: Apr. 7, 1978

[30] Foreign Application Priority Data

Apr. 22, 1977 [DE] Fed. Rep. of Germany ....... 2718100

[51] Int. Cl.² ............................................. C08G 18/38
[52] U.S. Cl. ...................................... 528/73; 252/182
[58] Field of Search .............. 260/77.5 CH, 77.5 AM, 260/72 R; 252/182; 528/73

[56] References Cited

U.S. PATENT DOCUMENTS 3,595,839  7/1971  Stokes .......................... 260/77.5 CH Primary Examiner—M. J. Welsh
Attorney, Agent, or Firm—Gene Harsh; Lawrence S. Pope; Frederick H. Colen

[57] ABSTRACT

The present invention relates to a process for the production of polyisocyanate polyaddition products by reacting organic polyisocyanates with compounds which give off organic diamines under the hydrolytic influence of water and also with water, optionally in the presence of sub-equivalent quantities, based on the NCO-groups present in the reaction mixture, of organic compounds containing isocyanate-reactive hydrogen atoms, wherein polycyclic condensation products of formaldehyde with aliphatic or cycloaliphatic diprimary 1,2-diamines are used as the compounds which give off organic diamines under the hydrolytic influence of water. The present invention also relates to the mixtures preferably used for carrying out this process, containing:

(a) at least one organic polyisocyanate; and
(b) a moisture-activatable hardener for component (a); distinguished by the fact that condensation products of formaldehyde with aliphatic or cycloaliphatic diprimary 1,2-diamines are used as hardener (b).

14 Claims, No Drawings

PROCESS FOR THE PRODUCTION OF POLYISOCYANATE POLYADDITION PRODUCTS WHICH COMPRISES REACTING ORGANIC POLYISOCYANATES, POLYCYCLIC CONDENSATION PRODUCTS OF FORMALDEHYDE WITH DIAMINES, AND WATER

FIELD OF THE INVENTION

This invention relates to a new process for the production of polyisocyanate polyaddition products by reacting organic polyisocyanates with certain moisture-activatable cross-linking agents described in more detail below and also with water, the organic compounds containing isocyanate-reactive hydrogen atoms known in polyurethane chemistry optionally being used in sub-equivalent quantities. The present invention also relates to a reaction mixture which is particularly suitable for carrying out the process according to the present invention.

BACKGROUND OF THE INVENTION

It has surprisingly been found that certain condensation products of formaldehyde with diprimary aliphatic or cycloaliphatic diamines, which are described in more detail below, are particularly suitable for use as latent, moisture-activatable hardeners for polyisocyanates. One particularly remarkable feature of these condensation products is that, on the one hand, they are largely stable with respect to water at room temperature in the absence of organic polyisocyanates and hydrolysis accelerating catalysts and, on the other hand, show little or no reactivity with polyisocyanates in the absence of water at room temperature. Accordingly, the condensation products are suitable for use both as latent hardeners for two-component polyurethane systems and as latent hardeners for single-component systems which are cross-linkable under the influence of atmospheric moisture and which contain NCO-prepolymers as the main binder component thereof.

The latent hardeners used in accordance with the present invention are superior to conventional masked diamines, for example according to US-PS No. 3,420,800, both in regard to the storability of the compositions in the absence of water and also in regard to the reactivity thereof in the presence of water and further in regard to the range of potential applications thereof.

SUMMARY OF THE INVENTION

The present invention relates to a process for the production of polyisocyanate polyaddition products by reacting organic polyisocyanates with compounds which give off organic diamines under the hydrolytic influence of water and also with water, optionally in the presence of sub-equivalent quantities, based on the NCO-groups present in the reaction mixture, of organic compounds containing isocyanate-reactive hydrogen atoms, wherein polycyclic condensation products of formaldehyde with aliphatic or cycloaliphatic diprimary 1,2-diamines are used as the compounds which give off organic diamines under the hydrolytic influence of water. The present invention also relates to the mixtures preferably used for carrying out this process, containing:

(a) at least one organic polyisocyanate; and (b) a moisture-activatable hardener for component (a); distinguished by the fact that condensation products of formaldehyde with aliphatic or cycloaliphatic diprimary 1,2-diamines are used as hardener (b).

DETAILED DESCRIPTION OF THE INVENTION

The production of the moisture-activatable cross-linking agents used in accordance with the present invention is known and is described, for example, by G. Volpp in Ber. Chem. Ges. 95 (1962), page 1493 (cf. also Beilstein, Vol. IV, page 250 and Ber. Chem. Ges. 31, (1898), page 3254) and by Krassig in Makromol. Chem. 17, pages 77–130 (1955). The production of latent cross-linkers suitable for use in accordance with the present invention is also described in US-PS No. 3,156,658. According to this reference, however, the compounds described therein are merely used in catalytic quantities as accelerators for the isocyanate polyaddition reaction.

To produce the moisture-activatable cross-linkers used in accordance with the present invention, from about 1 to 5 mols, preferably from about 1 to 3 mols, of formaldehyde are reacted with each mol of an aliphatic or cycloaliphatic diprimary 1,2-diamine. Thus, for example, a polycyclic tetraamine is formed from 2 moles of ethylene diamine and 4 mols of formaldehyde with elimination of 4 mols of water in accordance with the following equation:

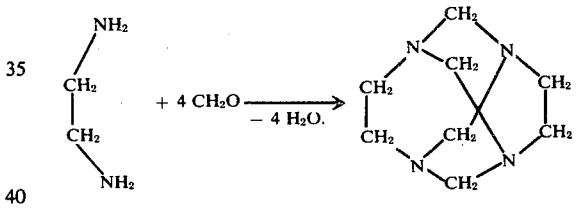

Depending upon the nature of the diamine used, polycyclic condensates of different constitution, preferably without any >C=N— double bonds and preferably containing solely tertiary nitrogen atoms, are formed during the condensation reaction with the formaldehyde.

Corresponding to the particularly preferred molar ratio of formaldehyde to diamine of about 2:1 which is applied in the production thereof, the polycyclic condensation products predominantly contain tertiary nitrogen atoms and methylene bridges in a ratio of 1:1.

The condensation reaction may be carried out in the absence or, preferably, in the presence of an inorganic or organic solvent. It is particularly preferred to use water as solvent. The presence of a basic catalyst, such as KOH or NaOH, accelerates the formation of the polycyclic condensation product.

The reaction may be carried out at a temperature of from about −20° to +150° C., preferably from about 0° to 100° C. However, it is particularly preferred to carry out the reaction at room temperature.

Diamines preferably used for producing the moisture-activatable cross-linkers suitable for use in accordance with the present invention are diamines corresponding to the following general formula:

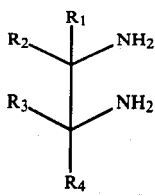

wherein $R_1$, $R_2$, $R_3$ and $R_4$, which may be the same or different, each represents hydrogen or an aliphatic hydrocarbon radical containing from 1 to 6 carbon atoms, in addition to which the radicals $R_2$ and $R_3$ may together with the carbon atoms attached to the amino groups complete a 5- to 7-membered cycloaliphatic ring and one of the radicals $R_1$ to $R_4$ may also represent a cyano group.

It is preferred to use diamines corresponding to the above general formula wherein at least two of the radicals $R_1$ to $R_4$ represent hydrogen and the remaining radicals represent a methyl group. Examples of suitable diamines include: 1,2-ethylene diamine, 1,2-propylene diamine, 1,2-dimethyl-1,2-ethylene diamine, 1,2-butylene diamine, 1,2-diaminocyclohexane, 1-cyano-1,2-diamino-ethane or 1,2-diaminohexane. Ethylene diamine and 1,2-propylene diamine are the preferred diamines.

In many cases, it is advantageous to use mixtures of different 1,2-diamines for the reaction in order to obtain more readily processible liquid mixtures of polycyclic condensation products. Particularly preferred mixtures are mixtures of 1,2-ethylene diamine and 1,2-propylene diamine in which the 1,2-diamine mixture may contain from about 1 to 99%, by weight, preferably from about 30 to 70%, by weight, based on the 1,2-diamine mixture, of 1,2-propylene diamine.

To produce the condensation products, the formaldehyde is preferably used in the form of an aqueous formalin solution.

The process according to the present invention is particularly suitable for the production of coatings on substrates of any type and for the production of seals, for example in the form of gap-filling compounds. The process according to the present invention may be carried out in different ways, depending upon the required application.

In a first embodiment of the process according to the present invention, the latent hardener essential to the present invention is mixed with polyhydroxyl compounds of the type known in polyurethane chemistry and the resulting mixture combined with a second component, the organic polyisocyanate, just before application. A reactive system is thus obtained which hardens both by reaction of the hydroxyl groups with some of the isocyanate groups in the polyisocyanate component and also under the influence of atmospheric moisture after application by the resulting formation of diamines from the latent hardener and the subsequent reaction thereof with some more of the isocyanate groups of the polyisocyanate component.

In a second embodiment of the process according to the present invention, the water required for releasing the diamines from the latent hardeners is directly added to the mixture of polyhydroxyl compounds and latent hardener. This is possible because, in the absence of the polyisocyanate component, hydrolytic splitting of the latent hardener occurs only slowly and incompletely. Following addition of the polyisocyanate component just before application of the two-component system, the diamine is completely released very rapidly and reacted with the isocyanate component so that it is possible with such systems to produce, for example, two-component polyurethane lacquers which undergo very rapid initial drying. The lacquer films are then completely dried by the relatively slow reaction of a second part of the isocyanate groups with the relatively slowly reacting hydroxyl groups. The water required for releasing the diamine may also emanate for example, from the fillers or pigments optionally used which, therefore, do not have to be predried.

In the first and second embodiments of the process according to the present invention, it is, of course, also possible to use the auxiliaries and additives normally encountered in lacquers, such as the conventional lacquer solvents, catalysts for the isocyanate polyaddition reaction, fillers, pigments, anti-sedimenting agents or levelling agents. These auxiliaries and additives are generally added to the component containing the latent hardener.

In the first and second embodiments of the process according to the present invention, the polyhydroxyl compounds and the latent hardeners essential to the present invention are used in such quantities that the equivalent ratio (hydroxyl groups of the polyhydroxyl compounds): (amino groups of the diamines formed from the latent hardeners) is preferably from about 20:1 to 1:1, most preferably from about 4:1 to 3:2. In the first and second embodiments, the quantity in which the polyisocyanate component is used is preferably such that from about 80 to 150, preferably from about 80 to 120, equivalent % of isocyanate groups are present, based on the sum of hydroxyl groups and amino groups released from the latent hardener by hydrolysis. In both embodiments the amount of compounds containing isocyanate-reactive groups this means of polyhydroxyl compounds is selected so that at most 98 equivalent % preferably at most 90 equivalent % of isocyanate-reactive groups this means of hydroxyl groups are present based on the isocyanate groups.

In a third embodiment of the process according to the present invention, which is particularly suitable for the production of thick-layer coatings or seals, the latent hardener is combined with a polyisocyanate component to form a one-component system which may be stored in the absence of atmospheric moisture and which is hardenable under the influence of atmospheric moisture. In this case, the quantitative ratios between the reactants are selected in such a way that at least 0,3 preferably from about 0.4 to 2.0, most preferably from about 0.8 to 1.2, potential amino groups are available per NCO-group.

In all embodiments of the process of the invention the amount of latent hardener essential to the invention is selected so that at least 0,3, preferably from about 0,4 to 2,0, most preferably from about 0,8 to 1,2 potential amino groups are available for each NCO-group which is in excess of isocyanate-reactive groups this means hydroxyl groups which may be present.

The one-component systems according to the third embodiment of the process of the invention may have the conventional auxiliaries and additives exemplified above added to them, although in this case it must be emphasized that, in cases where the systems are used for thick-layer coatings or seals, only small quantities of solvent should be used, preferably none at all.

In some cases, for example in the case of reactive aromatic polyisocyanates, it may be advantageous, in order to improve stability in storage, to use polyisocyanates containing blocked NCO-groups rather than free NCO-groups. Suitable blocking agents for this purpose are, for example, phenol, cresol, ε-caprolactam or malonic acid diethyl ester.

In all the embodiments of the process according to the present invention, the formaldehyde which is released in addition to the diamines during the hydrolytic splitting of the latent hardeners essential to the present invention may have an additional cross-linking effect.

Polyisocyanates suitable for use in the process according to the present invention are aliphatic, cycloaliphatic, araliphatic, aromatic and heterocyclic polyisocyanates of the type described, for example, by W. Siefken in Justus Leibigs Annalen der Chemie 562, pages 75 to 136, for example 1,6-hexamethylene diisocyanate, 1,12-dodecane diisocyanate, cyclobutane-1,3-diisocyanate, cyclohexane-1,3- and 1,4-diisocyanate, also mixtures of these isomers; 1-isocyanato-3,3,5-trimethyl-5-isocyanatomethyl cyclohexane (DAS No. 1,202,785), 2,4- and 2,6-hexahydrotolylene diisocyanate, also mixtures of these isomers; hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate, also mixtures of these isomers; diphenyl methane-2,4'- and/or -4,4'-diisocyanate, naphthylene-1,5-diisocyanate, triphenyl methane-4,4',4''-triisocyanate, polyphenyl polymethylene polyisocyanates of the type which may be obtained by condensing aniline with formaldehyde, followed by phosgenation, and which are described, for example, in British Pat. Nos. 874,430 and 848,671, perchlorinated aryl polyisocyanates of the type described, for example, in German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described, for example, in British Pat. No. 994,890, Belgian Pat. No. 761,626 and published Dutch Patent Application No. 7,102,524, polyisocyanates containing isocyanurate groups of the type described, for example, in German Pat. Nos. 1,022,789; 1,222,067 and 1,027,394 and in German Offenlegungsschrift Nos. 1,929,034 and 2,004,048, polyisocyanates containing urethane groups of the type decribed, for example, in Belgian Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394, in British Pat. No. 889,050 and in French Pat. No. 7,017,514, polyisocyanates obtained by telomerization reactions of the type described, for example, in Belgian Pat. No. 723,640, polyisocyanates containing ester groups of the type described, for example, in British Pat. Nos. 965,474 and 1,072,956, in U.S. Pat. No. 3,567,763 and in German Pat. No. 1,231,688, also reaction products of the above-mentioned isocyanates with acetals according to German Pat. No. 1,072,385.

It is also possible to use mixtures of the above-mentioned polyisocyanates.

In the first and second embodiments of the process according to the present invention, it is preferred to use organic polyisocyanates containing aliphatically or cycloaliphatically bound isocyanate groups. Preferred polyisocyanates for the first and second embodiments are, for example, 3,3,5-trimethyl-5-isocyanatomethyl cyclohexyl isocyanate, 1-methyl-2,4-diisocyanatocyclohexane, 1-methyl-2,6-diisocyanatocyclohexane, 4,4'-diisocyanatodicyclohexyl methane, 2,4'-diisocyanatodicyclohexyl methane and, in particular, urethane group- or biuret group-containing derivatives of these simple diisocyanates or of hexamethylene diisocyanate having a molecular weight below about 1000, such as may be obtained in known manner by partially converting the isocyanate groups of the above-mentioned diisocyanates into biuret groups or by reacting the above-mentioned diisocyanates with sub-equivalent quantities of low molecular weight polyols, such as trimethylol propane. Trimerization products, i.e. isocyanurate group-containing polyisocyanates having a molecular weight below about 1,000, produced from the above-mentioned diisocyanates are also among the preferred polyisocyanates for the first and second embodiments of the process according to the present invention.

In the third embodiment of the process according to the present invention, the polyisocyanate component preferably consists of NCO-prepolymers having an average NCO-functionality of from about 2 to 4, most preferably from about 2.2 to 3, an NCO-content of preferably from about 1 to 12, most preferably from about 1 to 5%, by weight, and an average molecular weight of preferably from about 500 to 10,000, most preferably from about 2000 to 5000, such as may be obtained in known manner, for example, by reacting polyhydroxy polyethers of the type exemplified below having an average molecular weight of preferably from about 200 to 10,000, most preferably from about 500 to 5000, and an average OH-functionality of preferably from about 2 to 4, most preferably from about 2.2 to 3, with excess quantities of aliphatic and/or cycloaliphatic diisocyanates of the type exemplified above, the unreacted excess of diisocyanate left over where a large excess of diisocyanate has been used preferably having been removed by distillation. It is preferred to use NCO-prepolymers based on aliphatic or cycloaliphatic diisocyanates containing isocyanate groups of different reactivity, such as those based on 3,3,5-trimethyl-5-isocyanatomethyl cyclohexyl isocyanate. NCO-prepolymers having molecular weights in the above-mentioned range with excess quantities of triisocyanates, such as tris-(isocyanatohexyl)-biuret, are also suitable, although less preferred. It is also possible to use with the NCO-prepolymers having molecular weights in the range defined above and also the above-mentioned NCO-functionality of diisocyanates, polyhydroxy polyethers and up to about 50 OH-equivalent % of low molecular weight alkane polyols.

Other starting components suitable for use in accordance with the present invention are compounds containing at least two isocyanate-reactive hydrogen atoms and generally having a molecular weight of from about 62 to 20,000. In addition to compounds containing amino groups, thiol groups or carboxyl groups, compounds of this type are preferably polyhydroxyl compounds, more especially compounds containing from about two to eight hydroxyl groups, for example polyesters, polyethers, polythioethers, polyacetals, polycarbonates and polyester amides of the type commonly used for the production of homogeneous and cellular polyurethanes.

Examples of suitable polyesters containing hydroxyl groups are reaction products of polyhydric, preferably dihydric, and, optionally, trihydric, alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example by halogen atoms, and/or may be unsaturated. Examples of these polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bis-glycol ester. Examples of suitable polyhydric alcohols include: ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol, sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers containing at least two, generally from about 2 to 4, preferably (on average) from about 2.5 to 3, hydroxyl groups which may be used in accordance with the present invention are also known and are obtained, for example, by the polymerization of epoxides, such as ethylene oxide, propylene oxide, butylene oxide, tetrahydrofuran, styrene oxide or epichlorhydrin, on their own, for example in the presence of $BF_3$, or by the chemical addition of these epoxides, optionally in admixture or in succession, with starter components containing reactive hydrogen atoms, such as alcohols or amines, for example water, ethylene glycol, 1,3- or 1,2-propylene glycol, trimethylol propane, 4,4'-dihydroxy diphenyl propane, aniline, ammonia, ethanolamine and ethylene diamine. Sucrose polyethers of the type described, for example, in German Auslegeschrift Nos. 1,176,358 and 1,064,938 may also be used in accordance with the present invention. In many cases, it is preferred to use polyethers of the type which predominantly contain primary OH-groups (up to 90%, by weight, based on all the OH-groups present in the polyether). Polyethers modified by vinyl polymers of the type obtained, for example, by the polymerization of styrene and acrylonitrile in the presence of polyethers (U.S. Pat. Nos. 3,383,351; 3,304,273; 3,523,093 and 3,110,695, German Pat. No. 1,152,536) are also suitable, as are polybutadienes containing OH-groups.

Among the polythioethers, particular reference is made to the condensation products of thiodiglycol with itself and/or with other glycols, dicarboxylic acids, formaldehyde, aminocarboxylic acids or amino alcohols. Depending upon the co-components, these products are polythio mixed ethers, polythioether esters or polythioether ester amides.

Suitable polyacetals are, for example, those compounds which may be obtained from the reaction of glycols, such as diethylene glycol, triethylene glycol, 4,4'-dioxethoxy diphenyl dimethyl methane and hexane diol, with formaldehyde. Polyacetals suitable for the purposes of the present invention may also be obtained by polymerizing cyclic acetals.

Suitable polycarbonates containing hydroxyl groups are those known compounds obtainable, for example, by reacting diols, such as 1,3-propane diol, 1,4-butane diol and/or 1,6-hexane diol, diethylene glycol, triethylene glycol and tetraethylene glycol, with diaryl carbonates, for example diphenyl carbonate, or with phosgene.

Examples of the polyester amides and polyamides are the predominantly linear condensates obtained from polybasic, saturated and unsaturated carboxylic acids and the anhydrides thereof and polyfunctional saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenolformaldehyde resins or even with urea-formaldehyde resins may also be used in accordance with the present invention.

Representative examples of these compounds used in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5–6 and 198–199, and in Kunststoff-Handbuch, Vol. VII, Vieweg-Hochtlen, Carl Hanser-Verlag, Munich, 1966, for example on pages 45 to 71.

The first and second embodiments of the process according to the present invention may, in particular, be carried out using linear or branched polyhydroxy polyesters having molecular weights of from about 500 to 3000, such as may be obtained from the exemplified starting materials, or using polyhydroxy polyacrylates having molecular weights of from about 2000 to 20,000, preferably from about 2000 to 10,000, of the type which may be obtained in known manner by copolymerizing olefinically unsaturated compounds, such as acrylonitrile, acrylic acid, methacrylic acid, styrene, acrylic acid methyl ester, methacrylic acid methyl ester, acrylic acid ethyl ester, methacrylic acid ethyl ester, ethylene, propylene and/or vinyl acetate, using hydroxyl group-containing unsaturated monomers, such as acrylic acid hydroxyethyl ester, methacrylic acid hydroxyethyl ester, acrylic acid hydroxypropyl ester or methacrylic acid hydroxypropyl ester. Both the polyesters and also the polyacrylates generally contain from about 1 to 10%, by weight, preferably from about 2 to 6%, by weight, of hydroxyl groups.

It is also possible to add to these polyhydroxyl compounds which are preferably used in accordance with the present invention up to at most about 30 hydroxyl equivalent % of polyols having a molecular weight of from about 62 to 500. Suitable such low molecular weight polyols are, for example, the polyhydroxyl compounds exemplified above as synthesis component for the polyhydroxy polyesters.

The polyhydroxy polyethers preferably used for producing the NCO-prepolymers used in accordance with the third embodiment of the process of the present invention are polyhydroxy polyethers of the type mentioned above in the description of the NCO-prepolymers, such as may be obtained by known methods from the exemplified starting materials.

Solvents suitable for use in the process according to the present invention are, in particular, aliphatic solvents, such as white spirit, aromatic solvents, such as toluene, xylene or relatively high boiling aromatic hydrocarbon solvents, including ketones, such as methylethyl ketone or methylisobutyl ketone, or esters, such as acetic acid butyl ester.

Catalysts suitable for use in the process according to the present invention are, in particular, the organometallic compounds known in polyurethane chemistry, more especially tin compounds, such as tin(II) salts of carboxylic acids, such as tin(II)acetate, tin(II)octoate, tin(II)ethylhexoate and tin(II)laurate, and the dialkyl tin salts of carboxylic acids, such as dibutyl tin diacetate, dibutyl tin dilaurate, dibutyl tin maleate or dioctyl tin diacetate.

Organic acids, such as benzene sulphonic acid or benzoic acid, may also be used as catalysts in accordance with the present invention. In the first and second embodiments of the process according to the present invention, it has also proved to be best to use polyhydroxy polyacrylates still containing free carboxyl groups as the polyhydroxyl component because the free carboxyl groups thereof take over the role of a catalyst accelerating the diisocyanate addition reaction.

In many cases, there is no need to use catalysts. However, if catalysts are employed, they are used in quantities of from about 0.01 to 1%, by weight, based on the polyhydroxyl component.

Suitable fillers which may also be used are, in particular, the fillers normally used for coatings and lacquers, such as heavy spar, chalk powder, talcum, polymeric silicas, sand, organic polymer powders or organic granulates.

Other suitable auxiliaries and additives which may optionally be used are the pigments, anti-sedimenting agents or levelling agents normally encountered in lacquers.

The process according to the present invention is particularly suitable for the production of films, lacquers or coatings on substrates of any type and also for the production of sealing materials, such as sealing compounds or gap-filling compounds.

The production of latent cross-linkers which may be used in accordance with the present invention is described in Examples 1 to 3 below.

EXAMPLES

EXAMPLE 1

A mixture of 240 g of a 40% aqueous formaldehyde solution in 150 g of water is run slowly, at from 20° to 30° C., into 125 g of ethylene diamine and 25 g of NaOH in 1500 ml of water. After a residence time of 20 hours at room temperature, most of the water is distilled off, the mixture filtered and the residue washed with cold dioxane.

Yield: 98 g of colorless crystals
M.p.: 217°–218° C.

EXAMPLE 2

226.8 g of a 37% aqueous formaldehyde solution are added, at from 30° to 50° C., to 103.6 g of 1,2-diaminopropane and 24.4 g of NaOH in 400 ml of water. 200 ml of water are distilled off, the residue is extracted with chloroform and the chloroform phase is dried over anhydrous $Na_2SO_4$. Removal of the chloroform by distillation leaves 105 g of a pale yellow viscous oil.

EXAMPLE 3

226.8 g of a 37% aqueous formaldehyde solution are added, at from 20° to 50° C., to 42 g of ethylene diamine, 51.8 g of 1,2-diaminopropane and 24.4 g of NaOH in 400 ml of water. After the mixture has reacted for 20 hours at room temperature, most of the water is distilled off. The residue is extracted with chloroform and the chloroform phase is dried with anhydrous $Na_2SO_4$. Removal of the chloroform by distillation leaves 93.2 g of a pale yellowish oil.

EXAMPLE 4

100.0 g of an NCO-prepolymer produced from a polyol mixture consisting of 1 mol of a linear polypropylene glycol having a molecular weight of 2000 and 0.4 mol of a propoxylated trimethylol propane having a molecular weight of 2000 and excess 3,3,5-trimethyl-5-isocyanatomethyl cyclohexyl isocyanate (NCO-content 4.0%, viscosity at 20° C.=approx. 7500 mPas) and 4.5 g of the cross-linker of Example 2 are mixed.

Coatings produced from the resulting mixture harden to a depth of from about 1 to 2 mm in one day at room temperature/50% relative air humidity. The mixture is storable for more than 14 days at 50° C.

EXAMPLE 5

Production of a moisture-hardening formulation for elastic coatings:
  100.0 g of the polyisocyanate of Example 4,
  50.0 g of heavy spar,
  10.0 g of titanium dioxide,
  0.2 g of carbon black,
  5.0 g of white spirit and
  4.0 g of the cross-linker of Example 2
are mixed to form a ready-to-use coating composition. The coating composition forms a skin after 8 hours in contact with atmospheric moisture (50%/20° C.) and hardens to form elastic coatings. Shore A hardness=50.

EXAMPLE 6

100.0 g of the polyisocyanate of Example 4,
  100.0 g of alkyl sulphonic acid ester ($C_{15}H_{31}$—$SO_3$—$C_6H_5$),
  75.0 g of chalk powder,
  25.0 g of highly disperse silica,
  2.0 g of carbon black,
  5.0 g of zeolite powder (molecular sieve) and
  4.0 g of the cross-linker of Example 2,
are mixed to form a ready-to-use sealing compound.

Seals produced using this sealing compound form a skin after 12 hours in contact with atmospheric moisture (50%) at a temperature of 20° C. and harden at a rate of from 1 to 2 mm (depthwise) per day. The material has a Shore A hardness of 30.

The following starting materials are used in following Examples 7 and 8:

Product 1: A polyester based on phthalic acid anhydride, α-ethyl hexanoic acid and trimethylol propane having an average molecular weight of 1500 and a hydroxyl content of 5.0%, by weight.

Product 2: A polyacrylate resin based on styrene, butyl acrylate and 3-hydroxypropylacrylate having a molecular weight of 3000 and a hydroxyl content of 4.2%, by weight.

Product 3: Cross-linker according to Example 1.

Product 4: The biuret polyisocyanate based on hexamethylene diisocyanate consisting essentially of tris-(isocyanatohexyl)-biuret, NCO-content 22.0%, by weight.

EXAMPLE 7

435.8 g of component (A) are mixed with 113.69 g of component (B) and the resulting mixture subsequently sprayed onto steel plates.

| Composition of component (A): | |
|---|---|
| Product 1, 75% in xylene | 106.67 parts, by weight |
| Product 3, 66% in ethylene glycol monomethyl ether acetate | 30.30 parts, by weight |
| Standard commercial-grade titanium pigment having a water content of 0.3%, by weight | 170.95 parts, by weight |
| Standard commercial-grade "anti-sedimenting agent" based on sodium aluminum silicate, 10% in xylene/propylene carbonate (8:1) | 17.10 parts, by weight |
| Zinc octoate, 10% in xylene | 4.27 parts, by weight |
| Standard commercial-grade levelling agent based on polyacrylate, 10% in ethylene glycol acetate | 1.07 parts, by weight |
| Standard commercial-grade silicone oil (levelling agent), 10% in xylene | 2.14 parts, by weight |
| Ethylene glycol acetate/butyl acetate (1:1) | 103.30 parts, by weight |
| | 435.80 parts, by weight |
| Composition of component (B): | |
| Product 4, 100% | 113.69 parts, by weight |
| Drying at room temperature in accordance with DIN 53 150 (drying stage 1): | approx. 3.5 hours |
| Pendulum hardness according to Konig (DIN 53 157), stoving conditions: 30 minutes at 80° C.: | approx. 105 seconds |

EXAMPLE 8

425.56 g of component (A) are mixed with 107.74 g of component (B) and the resulting mixture subsequently applied by spraying to steel plates.

| Composition of component (A): | |
|---|---|
| Product 2, 80.7% in ethylene glycol acetate | 99.13 parts, by weight |
| Product 3, 66% in ethylene glycol monomethyl ether acetate: | 30.30 parts, by weight |
| Standard commercial-grade titanium dioxide pigment (0.3%, by weight of water) | 166.19 parts, by weight |
| Standard commercial-grade "anti-sedimenting agent" based on sodium aluminum silicate, 10% in xylene/propylene carbonate (8:1) | 16.62 parts, by weight |
| Zinc octoate, 10% in xylene | 4.14 parts, by weight |
| Standard commercial-grade levelling agent based on polyacrylate, 10% in ethylene glycol acetate | 1.04 parts, by weight |
| Standard commercial-grade silicone oil (levelling agent) 10% in xylene | 2.08 parts, by weight |
| Ethylene glycol acetate/butyl acetate (1:1) | 106.06 parts, by weight |
| | 425.56 parts, by weight |
| Composition of component (B): | |
| Product 4, 100% | 107.74 parts, by weight |
| Drying at room temperature in accordance with DIN 53 150 (drying stage 1): | approx. 2.5 hours |
| Pendulum hardness according to Konig (DIN 53 157), stoving conditions 30 minutes at 80° C.: | approx. 120 seconds. |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyisocyanate polyaddition products by reacting organic polyisocyanates, polycyclic condensation products and water, optionally in the presence of subequivalent quantities of organic compounds containing isocyanate-reactive hydrogen atoms, said sub-equivalent quantities being based on the NCO-groups present in the reaction mixture, wherein said polycyclic condensation products are polycyclic condensation products of formaldehyde with aliphatic or cycloaliphatic diprimary 1,2-diamines, are free of any =C=N—bonds, contain only tertiary nitrogen atoms and give off organic diamines under the hydrolytic influence of water.

2. A process as claimed in claim 1, wherein the water taking part in the reaction is added to the reaction mixture by the action of atmospheric moisture on the reaction mixture.

3. A process as claimed in claim 1, wherein the water is added to the reaction mixture as such in liquid form.

4. A process as claimed in claim 1, wherein the water is added to the reaction mixture in the form of moisture contained in the starting materials or in the fillers used, if any.

5. A mixture hardenable under the hydrolytic influence of water comprising:
   (a) at least one organic polyisocyanate; and
   (b) a moisture-activatable hardener for component (a); wherein polycyclic condensation products of formaldehyde with aliphatic or cycloaliphatic diprimary 1,2-diamines which do not contain any >C=N—double bonds are used as hardener (b).

6. A process for the production of cross-linked polyisocyanate polyaddition products comprising reacting
   (a) organic polyisocyanates,
   (b) polycyclic condensation products produced by a reaction comprising reacting formaldehyde with aliphatic or cycloaliphatic diprimary 1,2-diamines, said polycyclic condensation products being free of any =C=N—bonds, containing only tertiary nitrogen atoms and releasing organic diamines under the hydrolytic influence of water, and
   (c) water.

7. The process of claim 6 wherein the equivalent ratio of potential amino groups from the polycyclic condensation products to isocyanate groups of the polyisocyanates is from about 0.4:1 to 2.0:1.

8. The process of claim 6 wherein organic compounds containing hydroxyl groups are present in sub-equivalent quantities, based on the isocyanate groups in the reaction mixture.

9. The process of claim 8 wherein the equivalent ratio of hydroxyl groups of the polyhydroxyl compounds to potential amino groups from the polycyclic condensation products is from about 20:1 to 1:1.

10. The process of claim 6 wherein the water is present in the form of atmospheric moisture.

11. The process of claim 6 wherein the water is present in liquid form.

12. Coatings produced from the curable mixtures of claim 5.

13. Sealing compounds produced from the curable mixtures of claim 5.

14. The process of claim 6 wherein the aliphatic or cycloaliphatic diprimary 1,2-diamines are of the formula

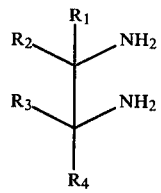

wherein
$R_1$, $R_2$, $R_3$, and $R_4$, which may be the same or different, represent hydrogen or an aliphatic hydrocarbon radical containing from 1 to 6 carbon atoms in addition to which $R_2$ and $R_3$ together with the carbon atoms attached to the amino groups may complete a 5- to 7-membered cycloaliphatic ring, and one of $R_1$ to $R_4$ may represent a cyano group.